J. M. ANDREWS.
MACHINE FOR FORMING CORRUGATED CARTONS.
APPLICATION FILED MAY 1, 1918.
1,314,115.
Patented Aug. 26, 1919.
12 SHEETS—SHEET 11.
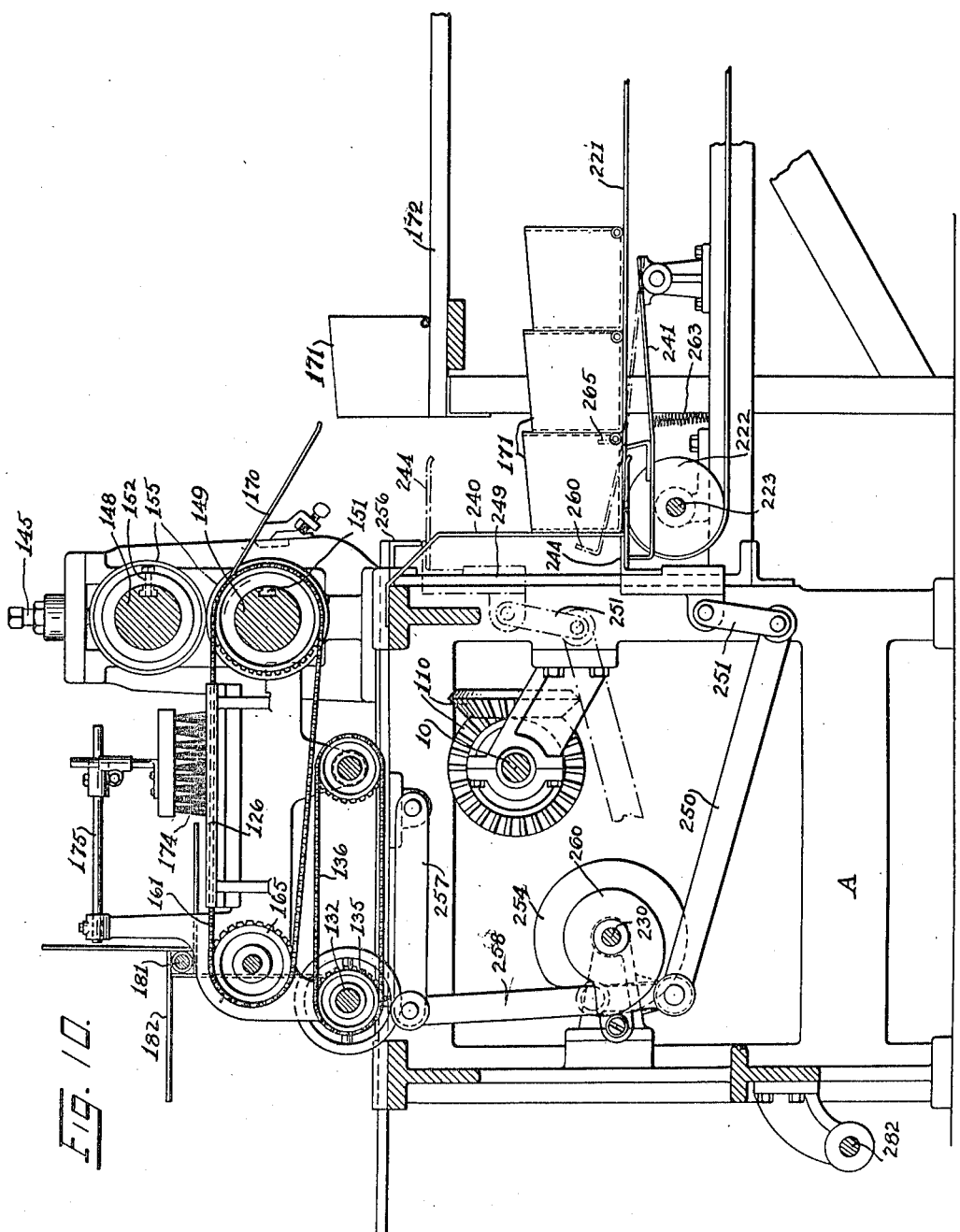
Witnesses:
Chas. E. Whiteman
Louis C. Badeau
Inventor:
James M. Andrews,
By his Atty. F. H. Richards.

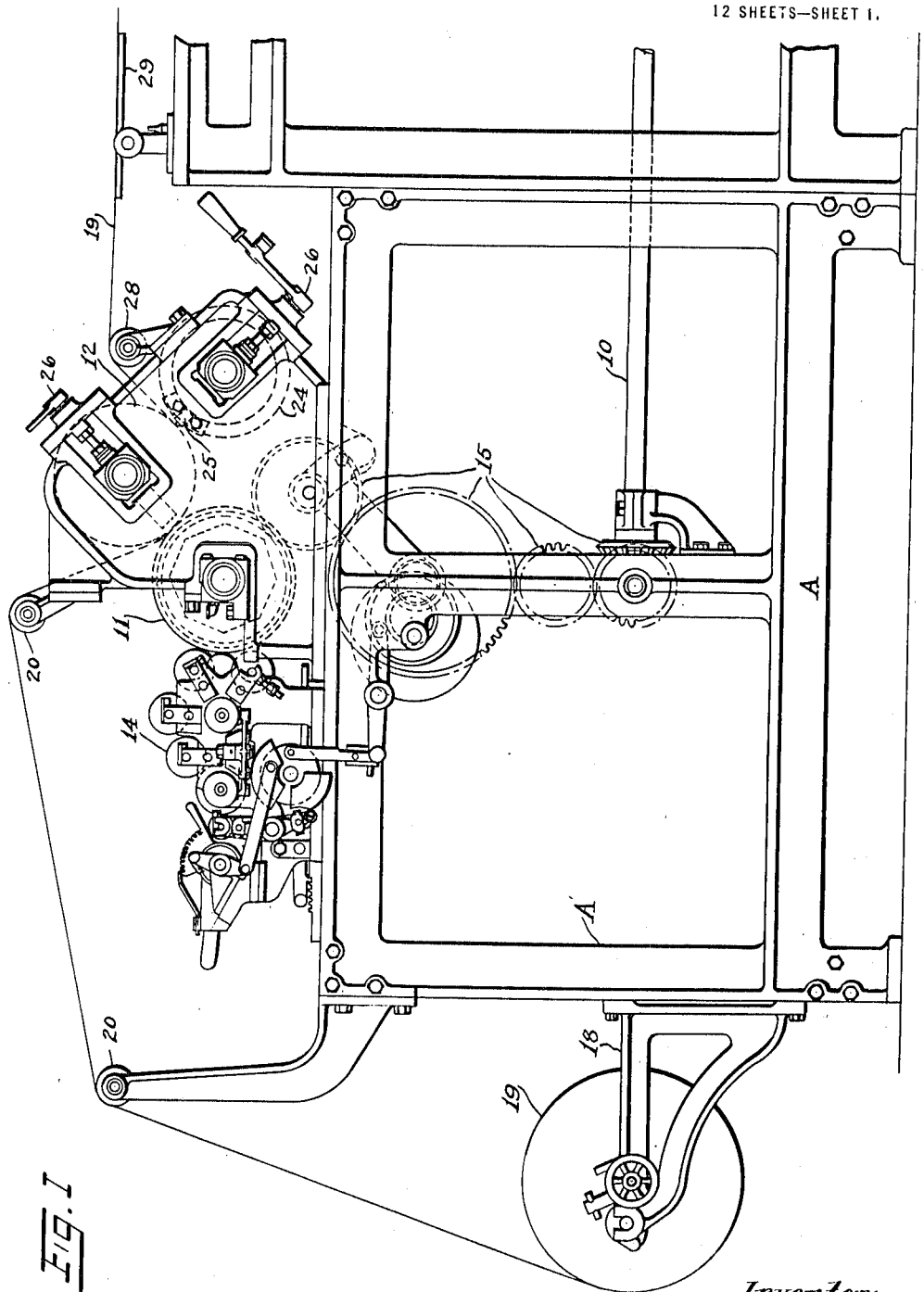

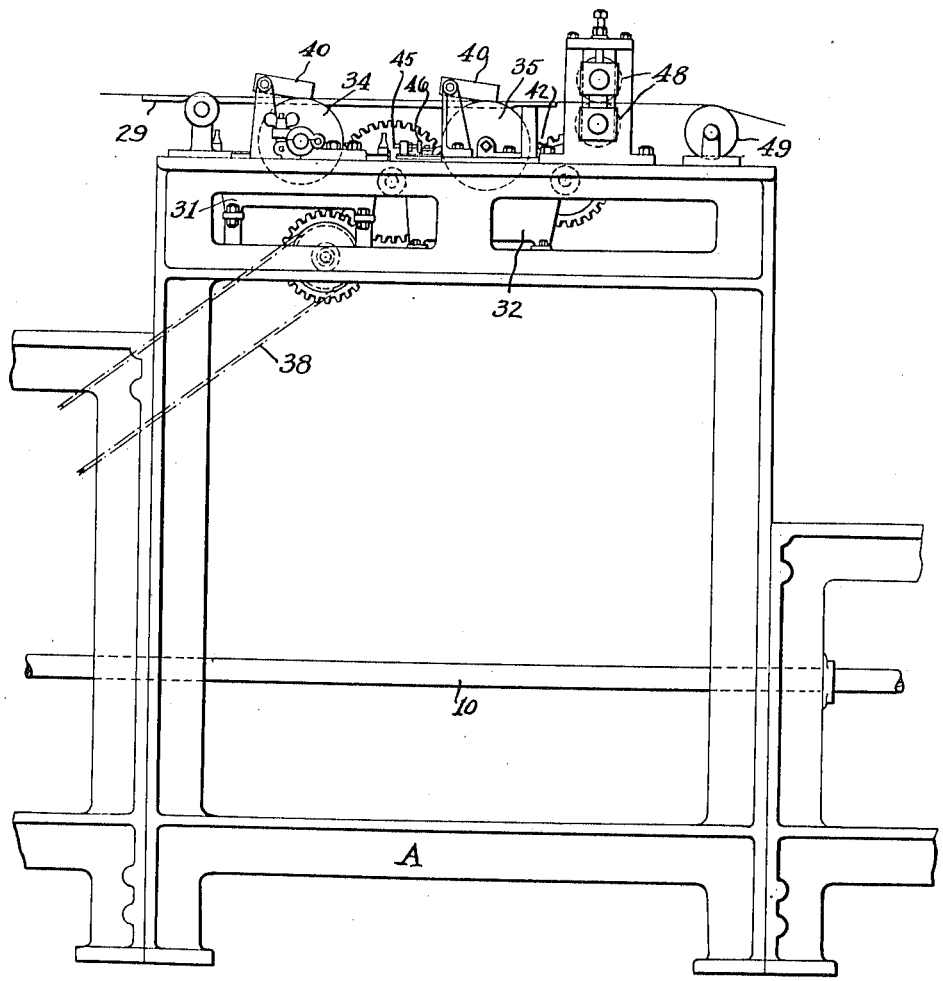

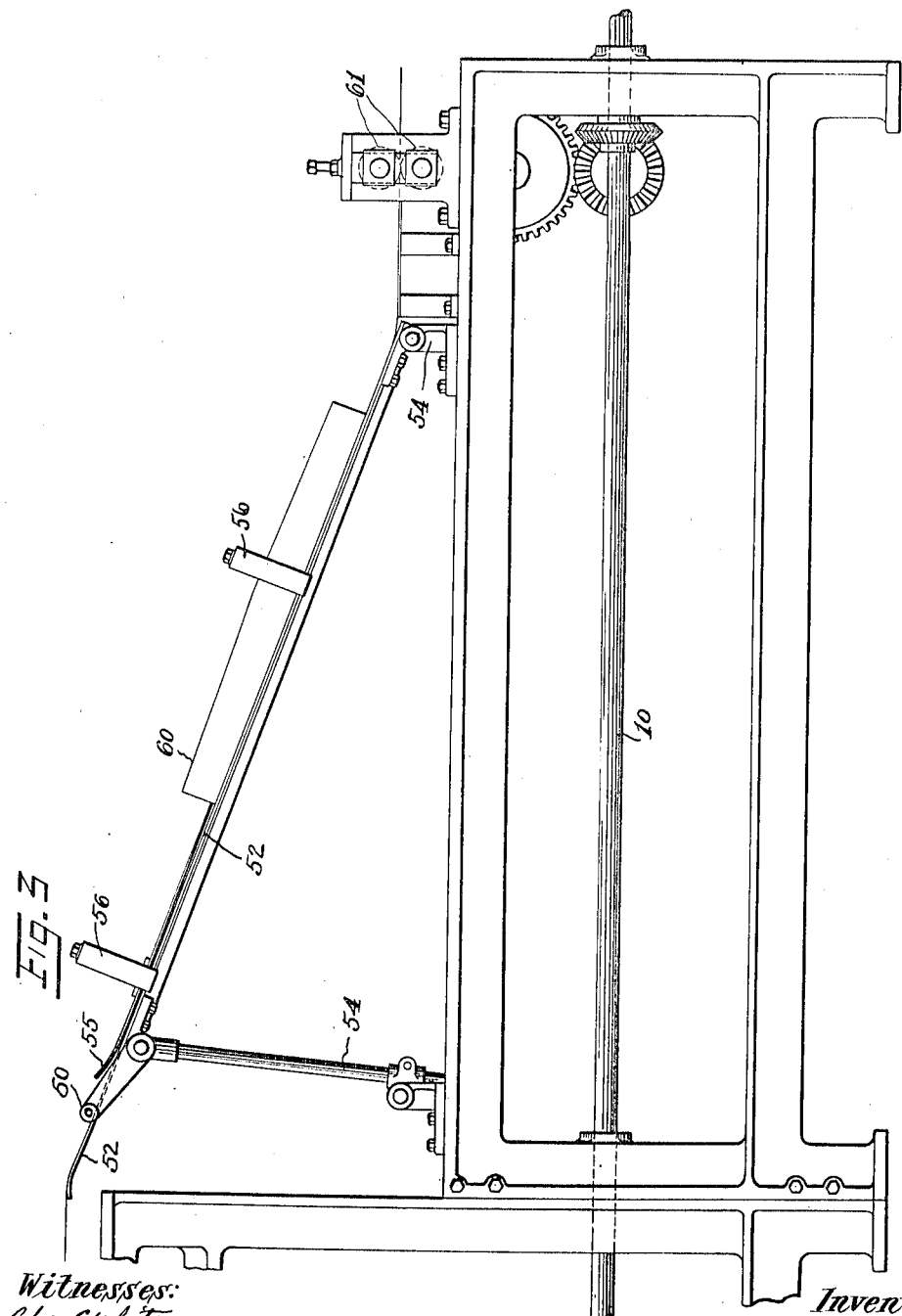

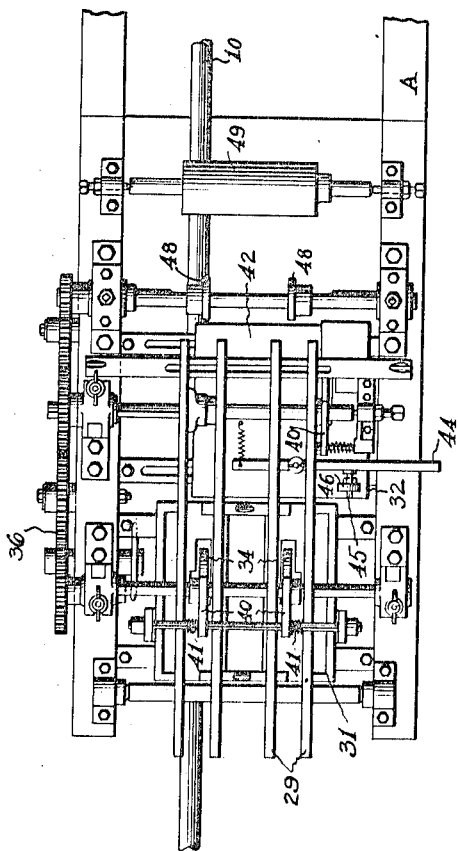
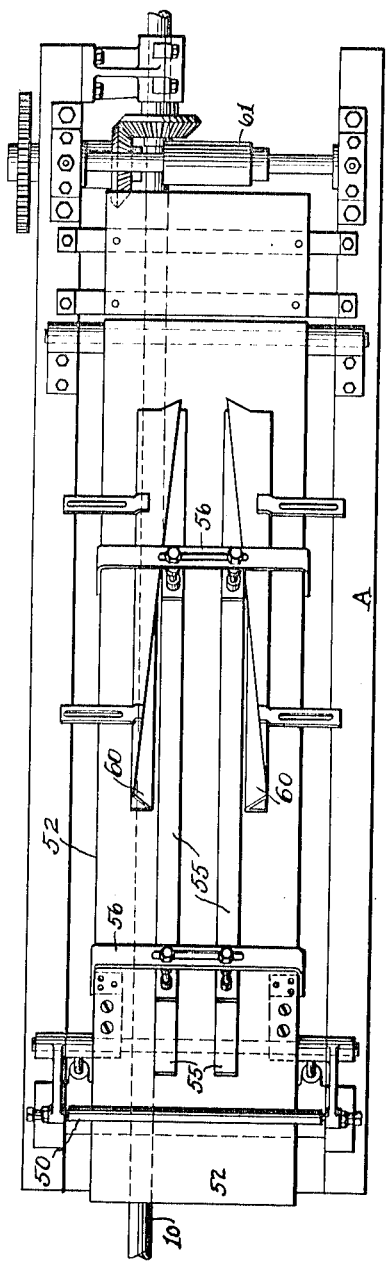

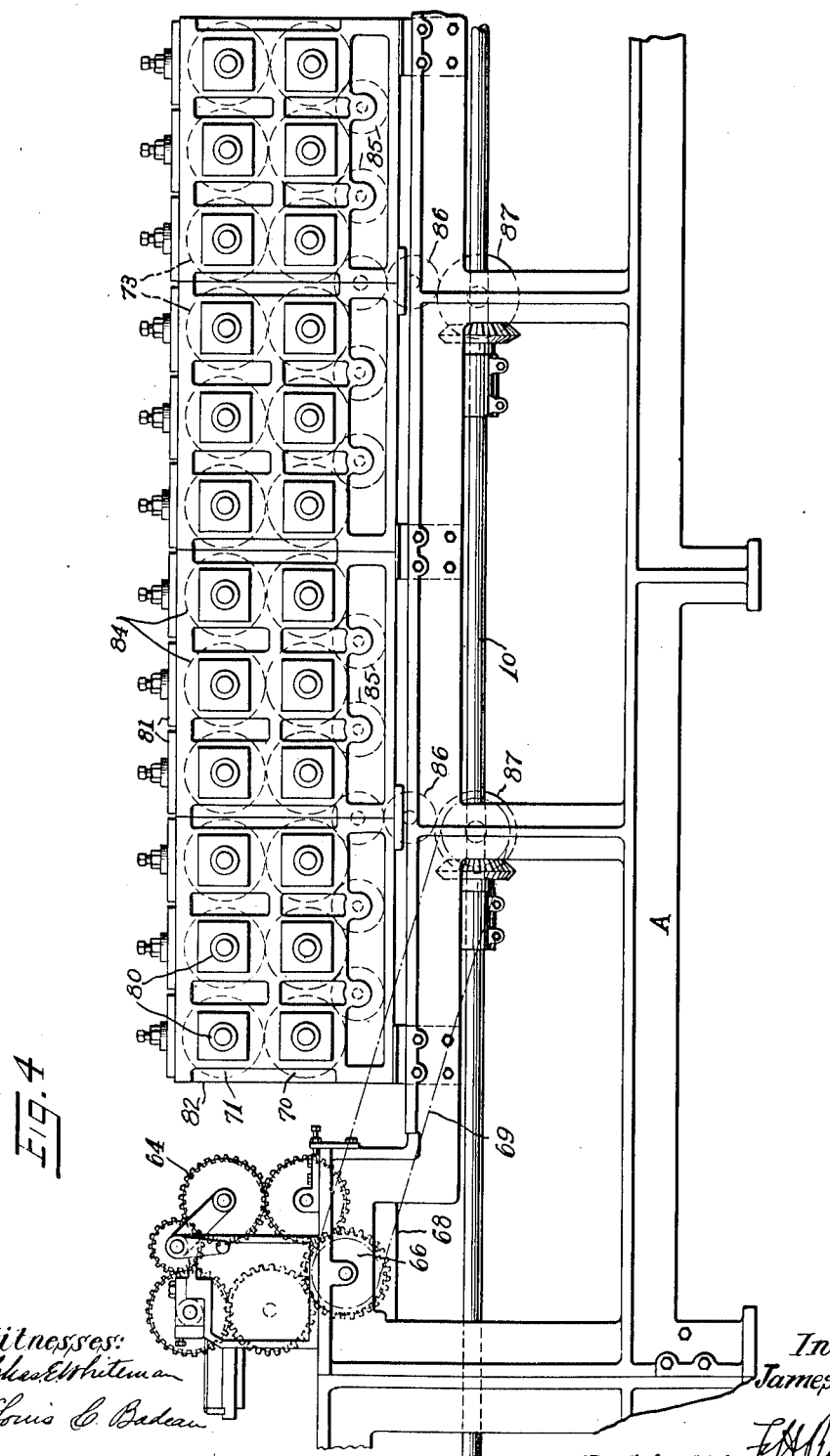

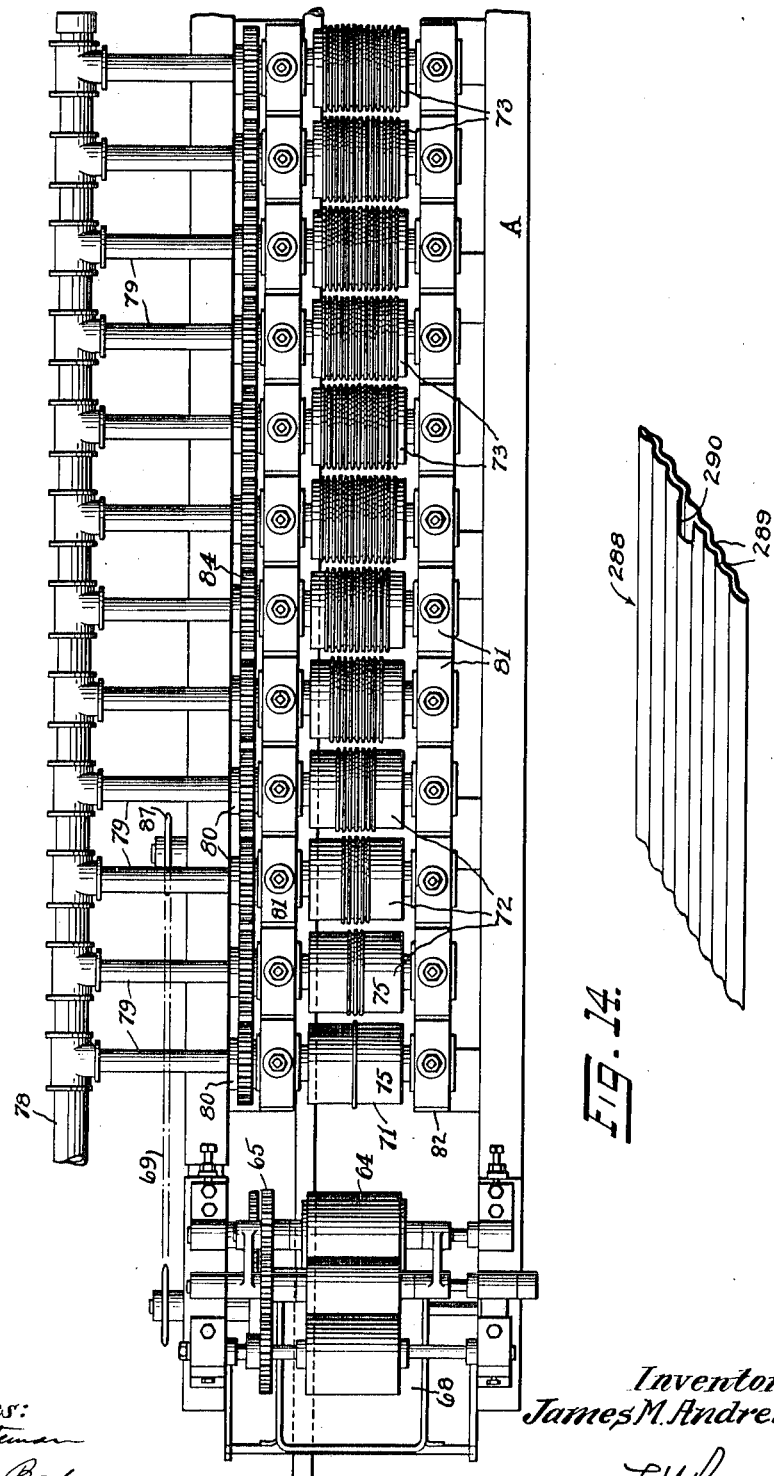

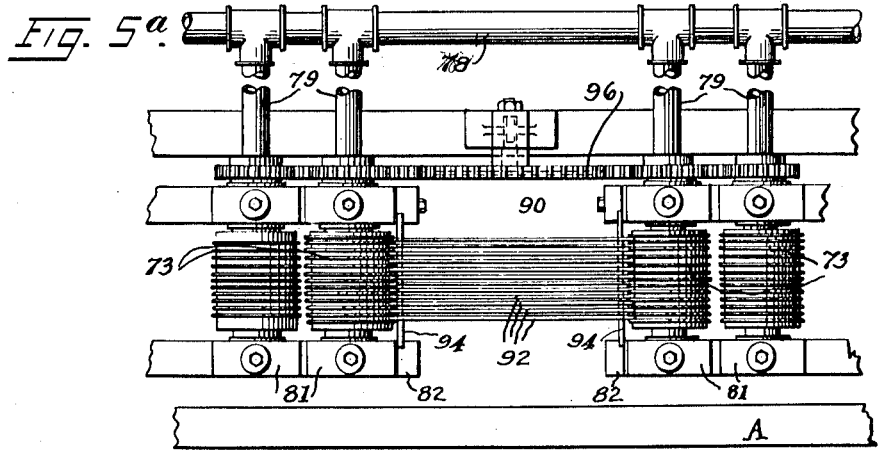
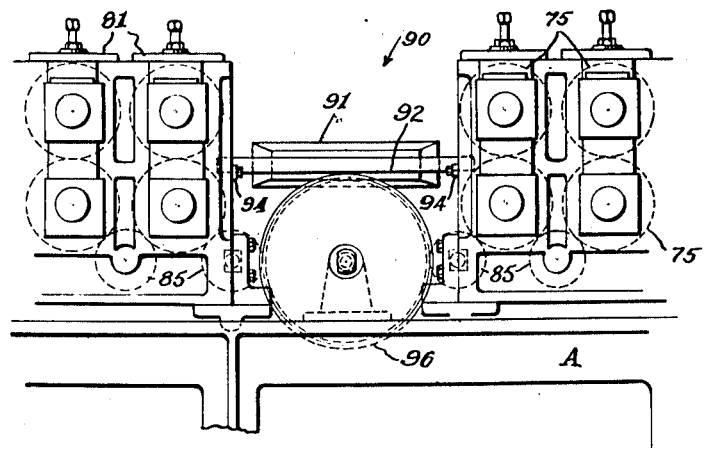

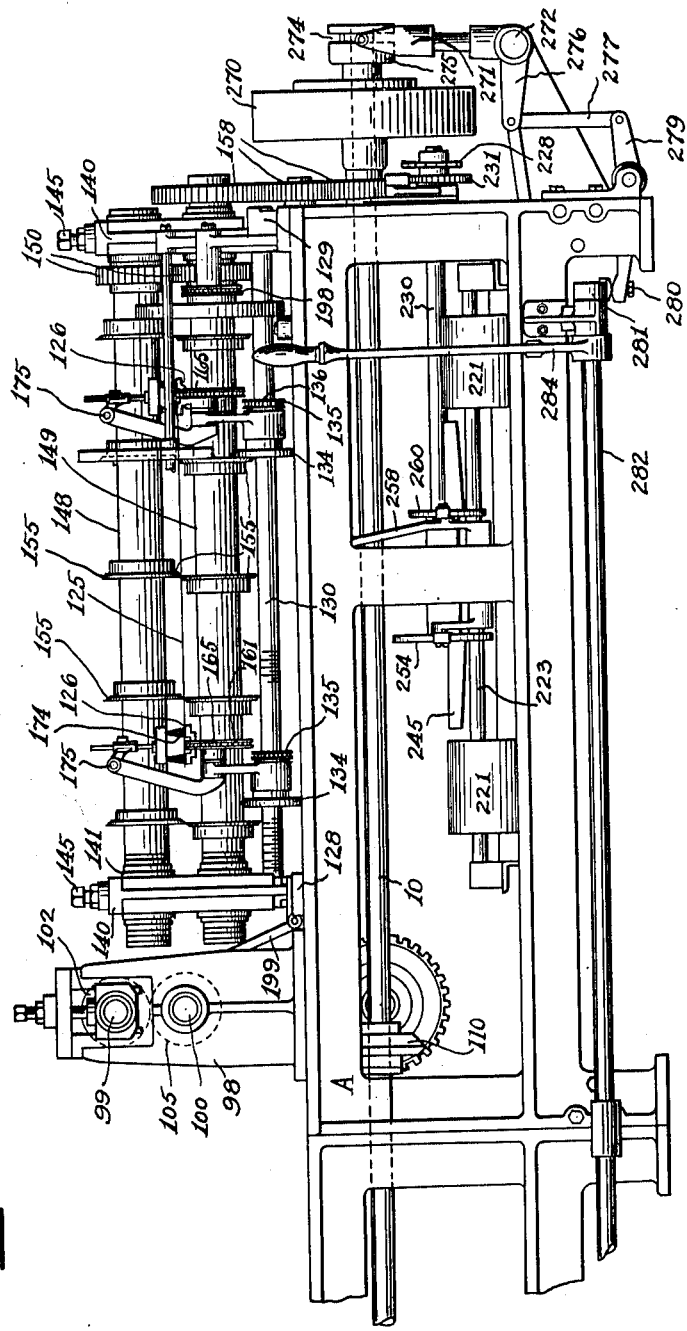

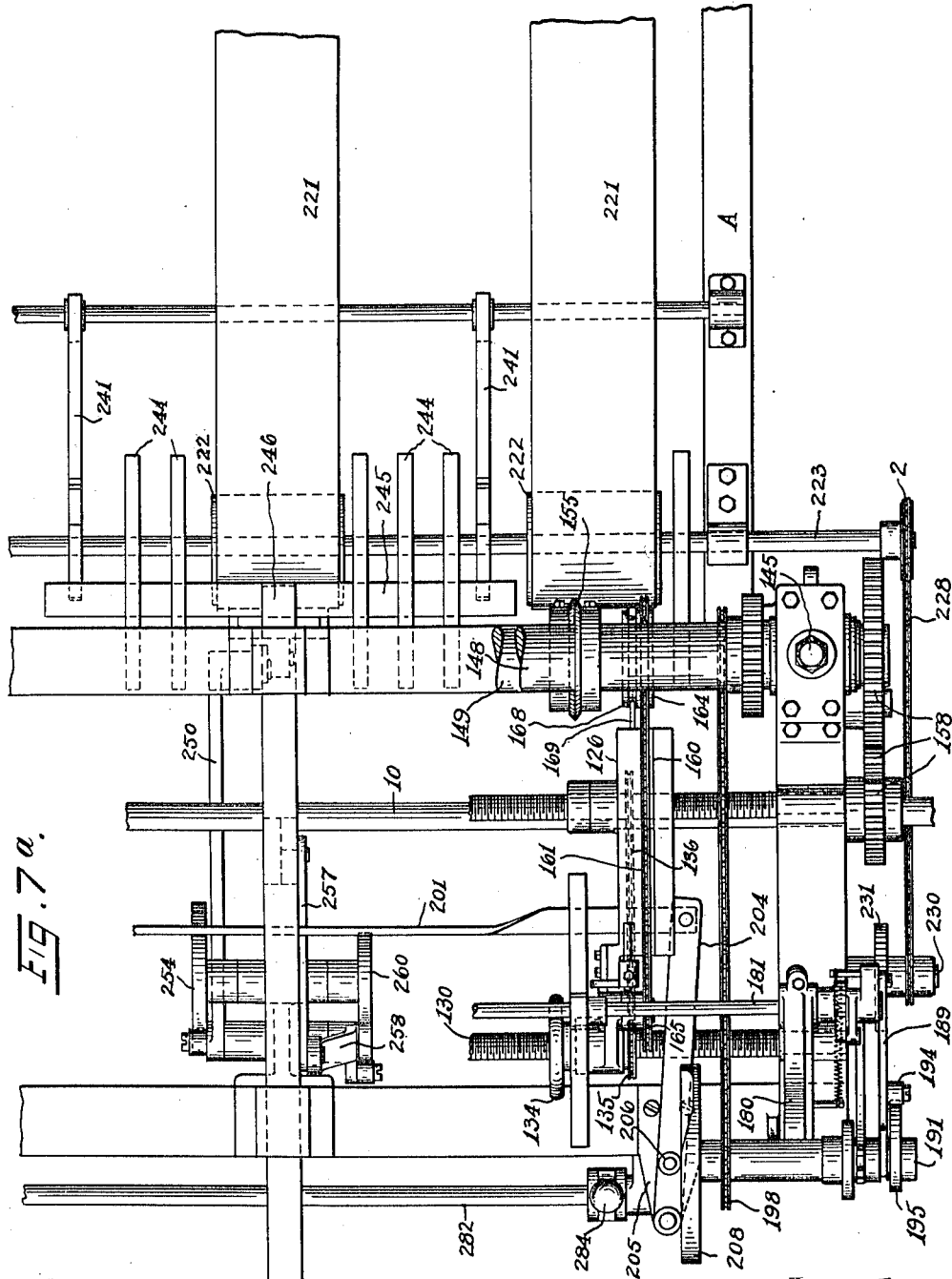

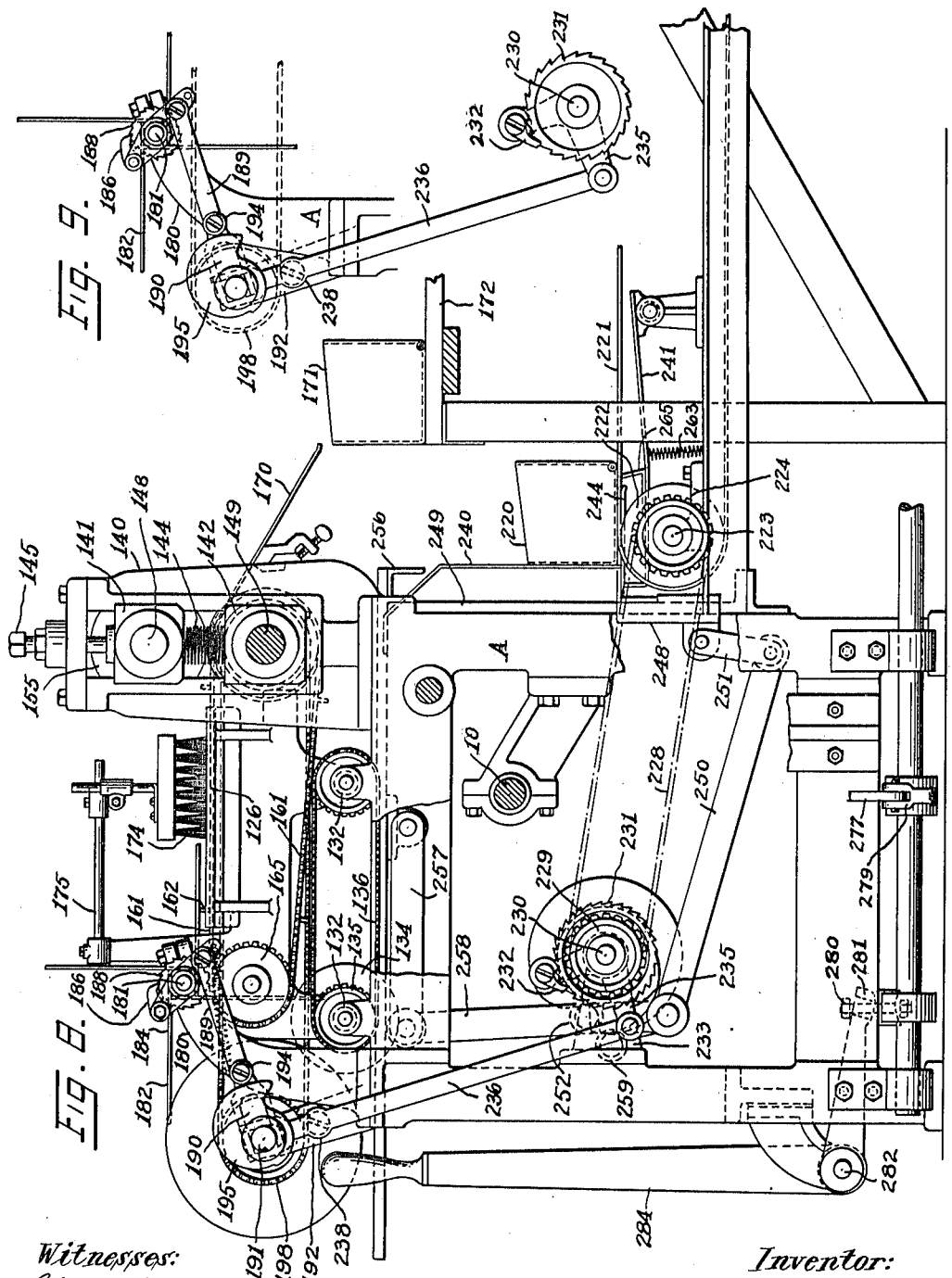

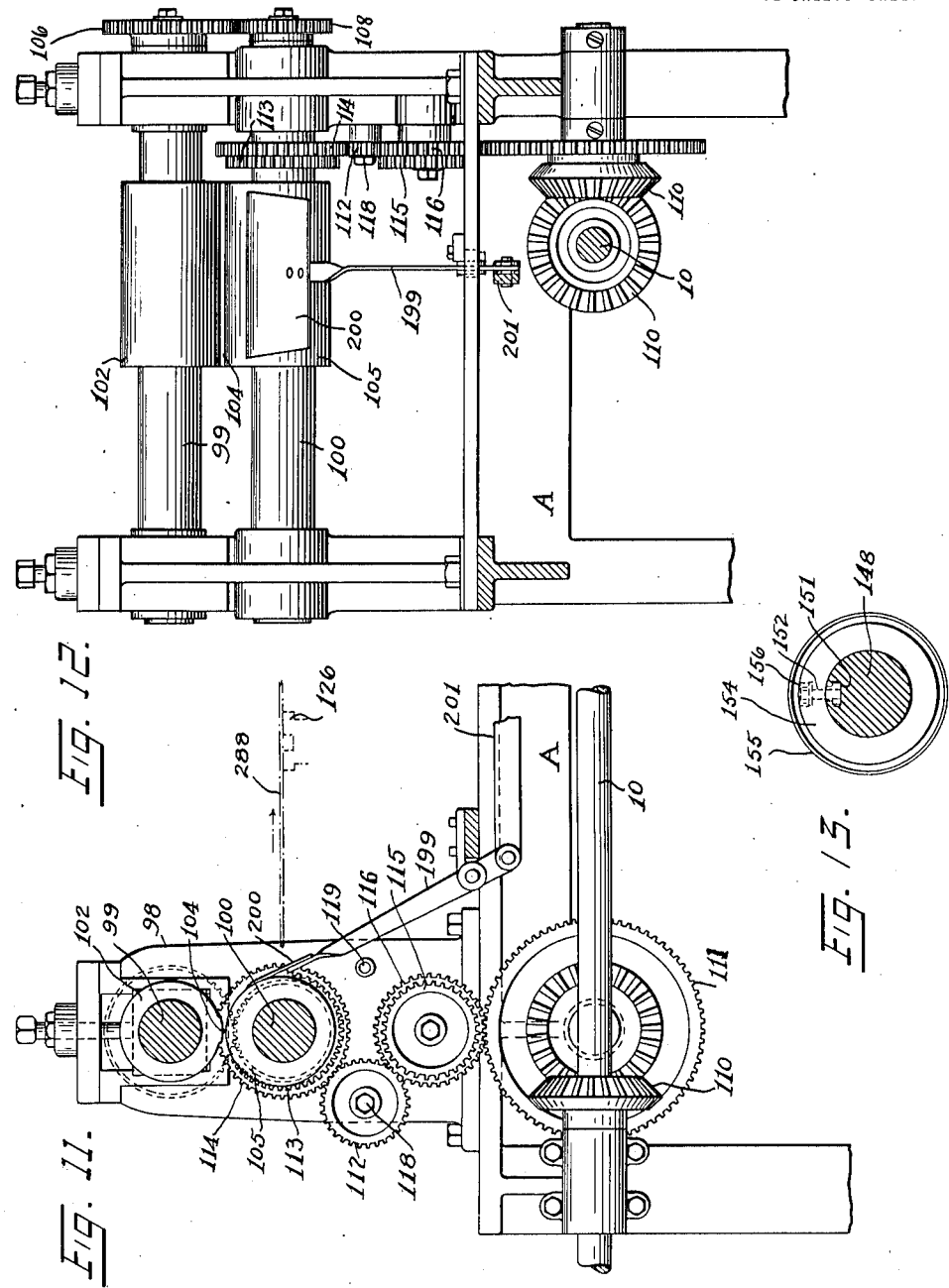

UNITED STATES PATENT OFFICE.

JAMES M. ANDREWS, OF BROOKLYN, NEW YORK, ASSIGNOR TO ROBERT GAIR COMPANY, OF BROOKLYN, NEW YORK, A CORPORATION OF NEW YORK.

MACHINE FOR FORMING CORRUGATED CARTONS.

1,314,115.         Specification of Letters Patent.     Patented Aug. 26, 1919.

Application filed May 1, 1918. Serial No. 231,828.

*To all whom it may concern:*

Be it known that I, JAMES M. ANDREWS, a citizen of the United States, residing in Brooklyn, in the county of Kings and State of New York, have invented certain new and useful Improvements in Machines for Forming Corrugated Cartons, of which the following is a specification.

This invention relates to processes and machines for printing and forming corrugated cartons for electric light bulbs or other articles.

One object of the invention is to provide an improved machine and process for forming corrugated containers from strips of card-board.

Another object is to provide an apparatus and process for corrugating sheets of flat material in a rapid and efficient manner.

Another object is to provide a special means and method of cutting and forming cartons in flat form which may be easily and conveniently unfolded.

These and many other objects will appear as the description proceeds; and while herein minute details of the invention are described, the invention is not limited to these, as the details of construction and operation may be greatly varied without departing from the scope of the invention as claimed.

The herein described machine comprises principally a folding mechanism and a corrugating mechanism, whereby the strip of card-board is corrugated after it is folded. There is also a printing mechanism, a punching mechanism for initially operating upon the card-board, and moistening and glue applying mechanisms for preparing the strip for the folding process. Before the strip is corrugated it is wet with water and after the corrugating, is cut into lengths and then into blanks of carton lengths.

In the accompanying drawings showing by way of example one of many possible embodiments of the invention,—

Figure 1 is a fragmental side elevation of the receiving end of the main frame, showing the printing and punching mechanisms;

Fig. 2 is a fragmental view showing the moistening and glue applying mechanisms;

Fig. 3 is a fragmental side elevation of a portion of the main frame showing the folding mechanism;

Fig. 3ª is a plan showing said folding mechanism;

Fig. 4 is a side elevation of a portion of the main frame carrying a wetting mechanism and the corrugating mechanism;

Fig. 4ª is a plan of the same;

Figs. 5 and 5ª respectively show a side elevation and plan of a modified arrangement of the corrugating mechanism;

Fig. 6 is a plan of the moistening and glue applying mechanisms;

Fig. 7 is a fragmental side elevation showing the discharge end of the machine;

Fig. 7ª is an enlarged plan of said discharge end;

Fig. 8 is an end elevation of the discharge end of the machine;

Fig. 9 is an elevation of details shown in Fig. 8;

Fig. 10 is a transverse vertical sectional view taken through the receiving end of the machine;

Fig. 11 is a longitudinal sectional view of the mechanism for cutting the folded strip into lengths;

Fig. 12 is an elevation of the same;

Fig. 13 is a detail view of one of the annular cutting knives for cutting said lengths into pieces; and Fig. 14 is a face view of one of the final blanks ready to be opened out as a carton.

The various mechanisms of the machine are mounted upon a main frame A which may be complete as a single frame or comprise different sections for the various mechanisms as shown. Longitudinally of the main frame there is disposed a main drive shaft 10, from which the various mechanisms are driven.

Near the receiving end of the main frame is disposed a printing mechanism, (Fig. 1), comprising a type cylinder 11, a coöperating impression cylinder 12, and an inking mechanism 14, all mounted upon the main frame and receiving their movement of rotation from the main shaft by means of a chain of gearing 15 connecting said main drive shaft with the printing cylinder. The printing mechanism and the inking mechanism form no part of the present invention and are therefore not described in detail.

At the receiving end of the machine there are provided a pair of card-board-roll brackets 18, carrying a roll of card-board or the like 19, from which a strip of cardboard passes over rollers 20 to between the type cylinder and the impression cylinder where advertising or other desired matter may be printed on the strip before the strip is corrugated. Coöperating with the impression cylinder 12 is a punch drum 24 provided with a punch 25 adapted to punch a series of holes in the card-board for a purpose which will be explained. The impression cylinder may be adjusted relatively to the type cylinder and the punch drum relatively to the impression cylinder by any suitable adjusting means 26. From the punch drum the card-board passes over a roller 28 to the horizontal supporting guides 29 (Figs. 2 and 6), supported upon the main frame. Beneath the guides 29 there are mounted a water container 31 and a glue container 32, into which dip respectively, the moistening rollers 34 and the glue applying roller 35. Said rollers are rotated by suitable gearing 36 and chain 38 and have the strip of card-board pressed upon them as it passes along by means of the pressing blocks 40, spring pressed against the card-board by means of coil springs 41. The moistening rollers 34 moisten the card-board along the lines where it is later to be folded, while the glue applying roller applies a suitable adhesive to the edge of the card-board for securing the edges together as will be explained. The glue container is provided with a suitable cover 42 which is held in place by means of a latch 44 mounted thereon and provided with a projection 45 passing through a perforated ear 46 formed on one of the side walls of the container.

From the guides 29 the strip of card-board is passed between and advances by means of the advancing rollers 48, thence over the supporting roller 49 and under the holding roller 50, (Figs. 3 and 3ª), to the inclined guide plate 52 supported over the main frame A by means of supports 54. The card-board is held upon the inclined plate 52 by means of the upper guides 55 adjustably mounted upon brackets 56, secured to the inclined plate. The card-board passes between said inclined plate and said upper guides into contact with the folding guides 60 secured upon said inclined plate and adapted to engage under and gradually fold upwardly and inwardly the edge portions of the strip, at the aforementioned moistened line, until the edges of the strip are brought into contact with each other, after which the folded strip passes between the pressing rollers 61 whereby said strip is pressed into flattened tubular form and said edges pressed into close contact to cause the glue to adhere.

From the pressing rollers 61, the tubular card-board passes to the wetting rollers 64 (Figs. 4 and 4ª), arranged in pairs and connected by suitable gearing 65 with each other and with a water applying roller 66 adapted to dip into a water tank 68 and convey water to the wetting rollers and thence to the card-board passing therebetween. The water applying roller and the wetting rollers are driven by means of a sprocket chain 69 suitably driven from the main shaft 10.

From the wetting rollers the tubular card-board passes to the corrugating rolls 70, 71, and 72, (Fig. 4ª). The corrugating rolls are arranged in superposed pairs. The upper roll of the first pair 71 is provided with a single corrugation coöperating with the space between the corrugations of the other roll, the succeeding intermediate rolls 72 being provided with corrugations increasing by small increments, for instance two corrugations for each succeeding pair of rollers until the maximum number of corrugations is provided, as on the final rolls 73. By this arrangement the card-board first receives a single corrugation as it passes the first pair of rollers 71 and receives additional corrugations as it passes the successive rollers, the lateral portions of the card-board being drawn gradually inwardly as the card-board progresses until the maximum number of corrugations and the minimum width of the card-board is reached, the uncorrugated portions 75 of the pairs of rollers being spaced apart sufficiently to prevent any binding friction.

Obviously if all portions of the first rollers 71 were corrugated, there would be a simultaneous corrugation of the whole width of the card-board would would prevent the gradual inward movement just explained because of the friction of the rolls thus causing the tearing of the card-board at practically every corrugation. It is to avoid this defect that the corrugations progressively increase in number throughout the series of rolls.

The rolls 70, 71 and 72 are hollow whereby an increased corrugating surface area is provided without materially increasing the weight of the rolls.

In order to drive out the moisture from the card-board and to cause the corrugations to become fixed in the card-board, it is desirable to apply heat to the corrugating rolls. This is done by passing steam from the main steam pipe 78 through the branch pipes 79 through the tubular journals 80 by which the corrugating rolls are supported in the bearings 81 carried on the bearing supports 82 mounted upon the main frame. The corrugating rolls of each pair are connected by means of gears 84 and the gears of successive pairs are connected to each other by means of idlers 85 one or more of which idlers are in turn connected by means of another idler 86 to a gear wheel 87 suitably connected with the main shaft 10, whereby all of the corrugating rolls are rotated for feeding the card-board through the series.

In order further to facilitate the drying of the card-board as it passes through the series of corrugating rolls, said series may be modified as shown in Figs. 5 and 5ª by separating adjacent pairs of the corrugating rolls 73 a distance apart so as to provide a drying space 90 across which a blast of air may be blown from a nozzle 91 supplied by means of a fan or other suitable air compressing means. In this case the card-board is supported in its passage across said space by means of a plurality of bridging bars 92 supported on cross bars 94 supported on the adjacent brackets 82. When the space is thus provided, movement of rotation is communicated between idlers 85 adjacent to such space by means of a single large idler 96.

From the corrugating rolls, the corrugated card-board is conducted to a means for cutting the strip of corrugated card-board into lengths. This means is shown in Figs. 7, 11, and 12, and comprises a pair of bearing brackets 98 mounted upon the main frame of the machine in which are rotatably mounted an upper shaft 99 and a lower shaft 100. Upon said upper shaft is mounted a cutting drum 102 provided with a cutting knife 104 adapted to coöperate with the most eccentric part of the eccentric drum 105 carried on said lower shaft 100. Said upper and lower shafts are connected by intermeshing gear wheels 106 and 108, said gear wheels being of different sizes so that the upper and lower shafts rotate at different speeds, the upper shaft for instance rotating twice while the lower shaft rotates three times. In this way said most eccentric part of the eccentric drum will coöperate with the knife only once during two complete rotations of the upper shaft and three rotations of the lower shaft, thus leaving a space between said knife and the eccentric drum every alternate time the knife reaches its lowest position of movement. In this way when said shafts are rotated the knife will cut only at each alternate rotation of the cutting drum and thus provide long lengths of material without the necessity of providing very large drums. Said drums are driven from the main shaft 10 by means of gear wheels 110, 111, the idler 112, and either gear wheel 113 or 114 in connection with either gear wheel 115 or 116, depending upon whether the idler 112 is placed upon the stub shaft 118 or the stub shaft 119. As is obvious by reference to Fig. 11, if the idler 112 is placed on the stub shaft 118, the idler meshes with the gear wheels 113 and 115 and the shafts 99 and 100 are driven at a greater speed than they will be if the idler is placed on the stub shaft 119 in mesh with the gear wheels 114 and 116. In this way the speed of the shafts 99 and 100 may be changed and consequently the lengths of material cut off by said knife.

Said lengths of material, as they issue from the cutting knife 104, are deposited upon a table plate 125, (Fig. 7), mounted upon a pair of table supports 126. Since the machine may be adjusted to cut different lengths of material, table plates 125 of different lengths are provided and it becomes necessary to provide means for adjustably disposing the table supports 126 different distances apart. This means will now be described.

Near the discharge end of the main frame there are provided a pair of cross pieces 128 and 129 on which are mounted a pair of threaded rods 130 on each of which are disposed a pair of sleeves 132, (Fig. 8), having threaded connection with said rods, and each provided with a hand wheel 134 and a sprocket wheel 135. The sprocket wheel of each sleeve on each rod is connected by means of a sprocket chain 136 with the corresponding sprocket wheel on the other rod, whereby when one sleeve is rotated by the hand wheel, the opposite sleeve will be correspondingly rotated and moved along the rod. Upon each pair of sleeves thus connected the table supports 126 are mounted and may be moved along the threaded rods by rotating said hand wheels and thus be made to accommodate table plates 125 of any length.

At one side of the discharge end of the main frame there are mounted a pair of journal brackets 140 carrying bearing blocks 141 and 142 yieldably held apart by means of a spring 144 and adjustably moved together by means of a suitable screw 145. In these bearing blocks are rotatably mounted upper and lower knife carrying shafts 148 and 149 operatively connected by means of intermeshing gear wheels 150 and each provided with a longitudinal undercut slot 151 (Fig. 13) in which is engaged the head of a bolt 152 passing through an opening in the hub 154 of one of the annular knives 155 adjustably slidably mounted on said upper and lower shafts and adapted to coöperate with each other for cutting into pieces said lengths of corrugated card-board, as will be explained. These knives are held in place by tightening the nuts 156 on said bolts 152 and may be moved and secured anywhere along said shafts merely by loosening said nuts and again tightening them after the proper position for the knives has been found. Said upper and lower shafts are rotated by means of gear wheels 158 operatively connecting them to the main shaft 10.

Each table support 126 is provided in its upper face with a track way 160 in which is slidable the upper part of a sprocket chain 161 provided with outwardly extending hooks 162 and disposed over a sprocket wheel 164 longitudinally movable on said lower shaft 149 and over another sprocket wheel 165 mounted on the end of the table support 126 remote from said shaft 149. The sprocket wheel 164 is fixed on the collar 168, (Fig. 7ᵃ) provided with an annular groove in which engages a projection 169 carried on the table support 126 whereby said collar 168 and the associated sprocket wheel are constrained to slide upon the lower shaft 149 as the table support 126 slides upon said threaded rods. Said collars are provided with suitable means engaging in the undercut groove 151 for causing said collars to rotate with said lower shaft. It will thus be seen that said sprocket chains 161 are constrained to move as the upper and lower shafts rotate, whereby said hooks 162 are caused to engage the edges of the lengths of card-board whereby said lengths are moved into engagement with said annular knives and cut into pieces and discharged down the chute 170 (Fig. 8) into the receiving box 171 conveniently carried on a table or other support 172.

In order to insure that the lengths of card-board be disposed parallel to said upper and lower shafts when the lengths are fed to the annular knives, retarding brushes 174 mounted upon adjustable supports 175 carried on the table supports 126, are provided for engaging the lengths and holding them back in their movement toward the annular knives until the edges of said lengths are engaged by said hooks 162 and the lengths are positively carried to the annular knives.

It is also desirable to hold the lengths of card-board down flat upon the table plate 125 to prevent their riding up over the hooks 162 and thus be carried unevenly, or not at all, to the annular knives. Means for accomplishing this will now be described.

Near the discharge end of the main frame at the side remote from the annular knives, there are provided supporting brackets 180, (Fig. 8), on which are rotatably mounted an arm-carrying shaft 181 on which are secured approximately radial arms 182 adapted to press the strip of material down against the table plate. These arms are given a step-by-step motion toward the table plate in order that the successive arms may hold down the strips of material as they are fed to the table plate. For accomplishing this rotary movement there is provided a pawl lever 184 adapted to oscilllate on the arm shaft 181 carrying a pawl 186 adapted to engage a ratchet 188 fixed on the arm shaft. This pawl lever is oscillated by means of a link 189 having an end slot 190 receiving a cam shaft 191 journaled on the bracket 180 carried on the main frame. This link is provided with a roller 194 adapted to be engaged by the cam 195 fixed on the cam shaft 191. Said shaft 191 is rotated by means of a sprocket chain 198, passing over a sprocket wheel on said cam shaft and over a sprocket wheel carried on the lower knife carrying shaft 149. This cam is so placed on the cam shaft that it causes said radial arms to engage each strip of material as it is fed to the table plate and then to pass down below the table plate after said strip has been carried out by the hooks 162, whereupon the next radial arm is brought down to engage the length of card-board next fed to the table plate.

In order that the length of card-board when fed to the table plate may be surely carried a sufficient distance longitudinally of the table plate and in proper relation to the cutting knives, there is provided a pusher 199 fulcrumed on the main frame and provided with a blade 200 on its upper end having its lower part connected by a link 201 to a lever 204, (Fig. 7ᵃ), fulcrumed on a bracket 205 carried on the main frame. Said lever 204 is provided with a roller 206 adapted to be engaged and oscillated by the pusher cam 208 carried on said cam shaft 191. This cam 208 is so designed that the blade 200 is disposed substantially in the position shown in Fig. 11, as the length of card-board is discharged from the cutting knife 104. The blade 200 then moves forward until said length is pushed sufficiently near the outer end of the table plate 125.

The lengths of card-board are fed through the annular knives and the pieces are fed to the receiving box 171 as has been explained. It is desirable that there be deposited into each box, a definite number of pieces and that the box be automatically removed and replaced by another when this number has been deposited. Means for accomplishing this will now be described.

The empty boxes 220, (Fig. 8), are brought inwardly toward the main frame of the machine by means of belt conveyers 221 carried upon drums 222 mounted on the rotatable shaft 223 carrying a sprocket wheel 224. This sprocket wheel 224 is connected by a chain 228 with a sprocket wheel 229 carried on a ratchet shaft 230 rotatably mounted upon a bracket 233 upon the frame of the machine. This ratchet shaft is provided with a ratchet wheel 231 adapted to be engaged by a pawl 232 carried on a bell crank lever 235 to which is pivotally connected a link 236 provided with a bifurcated upper end embracing the cam shaft 191. This link 236 is provided with a roller 238 adapted to be engaged by the cam 195 whereby said bell crank is oscillated and said ratchet shaft and said drum 222 are rotated step-by-step and said conveyer belts 221 moved inwardly step-by-step thus conveying inwardly the empty boxes 220 until they are stopped by the fixed stop 240 or by the pivoted latch 241 as will be explained.

After an empty box has been brought into engagement with the fixed stop 240 it is lifted from the conveyer belts by means of lifting plates 244 carried upon the main lifting plate 245 (Fig. 7ᵃ), mounted upon a lifting bracket 246 projecting from a shoe 248 (Fig. 8), vertically slidable upon a vertical guide bar 249 mounted upon the frame of the machine. This shoe is connected by means of a link 250 with a lifting lever 251 fulcrumed on said bracket 233 and carrying a roller 252 adapted to be engaged by a cam 254, (Fig. 7ᵃ), carried on the ratchet shaft 230. This cam 254 and the ports that coöperate with it are so timed that the receiving box 220 is raised as often as the required number of card-board blanks are fed from the chute 170.

After the lifting plate 244 has been raised to its upward limit of movement, the receiving box 220 is pushed off from the lifting plate on to the table 172 by means of the discharge bar 256 disposed transversely of the main frame and connected by means of a link 257 with the discharge lever 258 fulcrumed upon said bracket 233 and provided with a roller 259 engaging the cam 260 (Fig. 7ᵃ).

In order to prevent the belt conveyers 221 from bringing the receiving box into position beneath the lifting plates 244 when they are raised, the pivoted latch 241, (Fig. 10), is provided which is yieldably pressed upwardly by means of the spring 263 to the position on the dotted lines when the lifting plates 244 are raised. In this raised position the forward projection 265 engages the adjacent face of the receiving box, holding the receiving box in a position not under the lifting plates 244. When, however, the lifting plates 244 are lowered they engage the inner projection 266 on said latch and depress the latch to the position of the solid lines, thus lowering the projection 265 and permitting the belt conveyers to convey the receiving boxes to a position over the receiving plates and against the fixed guide-stop 240.

The main shaft 10 is connected to any suitable source of power by means of a clutch 270, (Fig. 7), provided with a clutch operating yoke 271 mounted on the transverse yoke shaft 272 and engaging the annular groove 274 of the clutch collar 275. The yoke shaft 272 is provided with a lever arm 276 connected by means of a link 277 with an intermediate lever 279 fulcrumed upon the main frame of the machine and connected by means of a link bolt 280 with a lever arm 281 mounted upon the lever shaft 282 on which is mounted one or more handle levers 284. It is noted that the yoke shaft 272 and the lever shaft 282 both extend a considerable distance along the main frame of the machine and the table 172 respectively, and may both be provided with handle levers wherever convenience suggests.

The operation of the machine will be readily understood from the foregoing and now need be only briefly summarized as follows:

The card-board passes from the roll 19, (Fig. 1), to the type cylinder 11 where printed matter may be printed thereon; thence to the punch drum where holes are punched at intervals along the strip of card-board. From the punch drum the card-board passes to the moistening and glue applying rollers 34 and 35, (Fig. 2), where parallel lines of moisture are applied to the card-board and glue applied to one edge of the card-board. From said rollers the card-board passes over the inclined guide plate 52 (Figs. 3 and 3ᵃ), and under the upper guides 55 to the folding guides 60. The edge portions of the card-board are engaged by the folding guides 60 and folded along the moistened line until said edge portions are folded somewhat flat upon the middle portion of the card-board with the edges in contact with each other. From the folding guides the card-board passes to the pressing rollers 61 which press the edges together and which cause the glue to adhere.

From the pressing rollers 61 the folded card-board passes to the wetting rollers 64 (Figs. 4 and 4ᵃ), where water is applied for softening the card-board before it reaches the corrugating rollers 71.

At the corrugating rollers 71 a single central corrugation is formed in the card-board and the lateral portions of the folded strip are drawn slightly inwardly, since the smooth portion 75 of the coöperating rollers are so spaced apart that frictional resistance does not interfere with its inward drawing movement. As the folded strip progresses to the successive corrugated rollers additional corrugations are formed preferably two at a time, one on each side of the previously formed corrugation or corrugations and the inward drawing of the lateral portions of the card-board continues, until the desired number of corrugations has been formed. While this corrugating is taking place steam is applied to the interior of the corrugating rollers thereby facilitating the drying of the moistened card-board and the setting of the corrugations.

If the drying space 90 (Fig. 5) is provided, when the corrugated strip reaches this space, a blast of preferably heated air is blown across the card-board additionally facilitating the drying. From this space the card-board passes to additional corrugating rolls and thence to the cutting mechanism illustrated in Figs. 7, 11, and 12.

Because of the differential gearing 106, 108, (Fig. 12), the most eccentric portion of the eccentric drum 105 coöperates with the cutting knife 104 only one within two revolutions of the knife 104.

The lengths of card-board pass to the table plate 125 and are there pushed forward by means of the pusher blade 200, after which they are carried laterally by means of the hooks 162, (Fig. 8), to annular knives (Fig. 7), being in the meantime held against the hooks 162 by means of the brushes 174 and the holding arms 182.

From the annular knives 155, the card-board blanks slide along the chute 170 and are discharged into the receiving box 171 until the desired number have been deposited. At this instant the empty box 220 which has been raised from the belt conveyers 221 to upper position by means of the lifting plates 244 is pushed off the lifting plates by means of the discharge bar 256, thus displacing the filled box 171 and substituting therefor an empty box 220. This process repeats itself as often as the empty boxes are filled.

When the lifting plates 244 are raised, the projection 265 also rises and prevents further receiving boxes from coming to position under the raised lifting plates.

When the lifting plates are lowered the projection 241 is also lowered, permitting the receiving box to be conveyed to position against the fixed guide stop 240.

It is noted that the hole punched by the punch 25 (Fig. 1), is made before the card-board is folded. Therefore the punched hole after the card-board has been folded and corrugated registers with an unpunched portion of the card-board. These holes are so spaced on the card-board that the cuts made by the annular knives 155 come mid-way across said holes, if desired, also mid-way between said holes. In this way a blank 288 is provided comprising two thicknesses 289 in one of which is a cutout 290 by which the upper thickness of the blank can be easily grasped for opening out the carton for receiving an electric bulb or other article therein, as shown in Fig. 14.

I claim:

1. In a corrugating machine, the combination of a main frame, a series of pairs of hollow corrugating rolls rotatably mounted on said main frame, means for feeding a moistened strip between said rolls, and means for heating the interior of said rolls for heating the strip simultaneously with forming the corrugations.

2. In a corrugating machine, the combination of a main frame, a series of pairs of hollow corrugating rolls rotatably mounted on said main frame, means for previously wetting a strip being acted on by said rolls, and means for heating the interior of said rolls for heating the strip simultaneously with forming the corrugations.

3. In a corrugating machine, the combination of a main frame, a series of pairs of hollow corrugating rolls rotatably mounted on said main frame, means for previously wetting a strip being acted on by said rolls, and means for conducting steam to the interior of said rolls for heating the strip simultaneously with forming the corrugations.

4. In a corrugating machine, the combination of a main frame, a series of pairs of superposed hollow corrugating rolls rotatably mounted on said main frame, means for feeding a moist strip between said rolls, and means for conducting steam to the interior of said rolls for heating the strip simultaneously with forming the corrugations.

5. In a corrugating machine, the combination of a main frame, a series of pairs of superposed hollow corrugating rolls rotatably mounted on said main frame, means for previously wetting a strip before being acted on by said rolls, means for conducting steam to the interior of said rolls for heating the strip simultaneously with forming the corrugations.

6. In a corrugating machine, the combination of a main frame; a series of pairs of superposed hollow corrugating rolls rotatably mounted on said main frame, the number of corrugations on the successive pairs of rolls increasing by small increments; means for previously wetting a strip before being acted on by said rolls, means for feeding a continuous strip of material to said rolls; means for driving said rolls in unison; and means for conducting steam to the interior of said rolls to dry the strip simultaneously with forming corrugations thereon.

7. In a corrugating machine, the combination of a frame; a series of pairs of coöperating corrugating rolls rotatably mounted on said main frame, the number of corrugations on the successive pairs of rolls increasing by small increments; means for previously wetting a strip before being acted on by said rolls; means for feeding a continuous strip of material to said rolls; means for driving the rolls; and means for conducting heat to the interior of the rolls to dry the strip simultaneously with forming corrugations thereon.

8. In a corrugating machine, the combination of a main frame; journal boxes supported on said main frame; a series of pairs of superposed hollow corrugating rolls, the first of said pairs being each provided with a single corrugation, the number of corrugations on the successive pairs of rolls increasing by small increments; journal shafts on each of said rolls and received by said bearing boxes, one of the journal shafts of each roll being tubular; means for feeding a continuous strip of material to said rolls; means for driving said rolls in unison; steam pipes having steam-tight connection with said tubular journals, whereby steam is conducted to the interior of the corrugating rolls; certain of said pairs of rolls being separated and spaced from the preceding rolls whereby a drying space is provided; and means for blowing air across said space.

9. In a corrugating machine, the combination of a frame; pairs of wetting rollers; means for feeding a continuous strip of card-board to the wetting rollers; a series of pairs of hollow corrugated corrugating rolls adapted to receive the card-board from said wetting rollers, the first of said pairs of rollers being provided with a single corrugation, the one coöperating with the other, the number of corrugations upon the successive pairs of rollers increasing by increments of two; journal shafts on each of said rollers, one of which shafts is tubular; bearing boxes supported on said main frame and receiving said journal shafts; steam pipes having steam-tight connection with said tubular journals whereby steam is conducted to the interior of the corrugating rolls; and means for rotating said corrugating rolls.

10. In a corrugating machine, the combination of a main frame; a main drive shaft thereon; a series of pairs of superposed hollow corrugated corrugating rolls, the first of said pairs of rolls being each provided with a single corrugation, the one coöperating with the other, the number of corrugations on the successive pairs of rolls increasing by increments of two; journal shafts on each of said rolls, one of which shafts is tubular; bearing boxes supported on said main frame and receiving said journal shafts; means for feeding a continuous strip of card-board to said corrugating rolls; means for wetting said strip before it is fed to the rolls; intermeshing spur gears on said shafts for causing the corrugating rolls to move in unison; idler gears operatively connecting successive pairs of intermeshing gears, one of said idlers having geared connection with said main shaft; upper and lower steam pipes; branch pipes communicating with said steam pipes, and having steam-tight connection with the tubular journals whereby steam is conducted to the interior of the corrugating rolls; certain of said pairs of rolls being separated and spaced from the preceding rolls whereby a drying space is provided therebetween; means for blowing air across such space; and a plurality of connecting bridges bridging said space for guiding card-board across the space.

11. In a machine for printing and forming cartons, the combination of a frame; means for feeding a continuous strip of card-board along the frame; means for printing matter upon the card-board; and means for subsequently corrugating the card-board in its entirety.

12. In a machine for printing and forming corrugated cartons, the combination of a main frame; a main drive shaft extending longitudinally of the main frame; means for carrying a roll of card-board or the like at the receiving end of the main frame; a type cylinder mounted transversely of the main frame near said brackets and having geared connection with said drive shaft; inking rollers coöperating with said printing cylinder; an impression cylinder coöperating with said printing cylinder, between which cylinders card-board is fed from the card-board roll; pairs of wetting rollers adapted to receive the card-board after it has passed the type cylinder; a series of pairs of superposed hollow corrugating rolls adapted to receive card-board from said wetting rollers; means for introducing steam into said corrugating rolls; and means operatively connecting said corrugating rolls to the main shaft for driving them in unison.

13. In a machine for forming cartons, the combination of a main frame; means for feeding a continuous strip of card-board along the main frame; means for punching holes along the card-board as it is fed; means adapted to moisten said card-board along the line where it is later to be folded; means for applying glue to the edge of the card-board; folding guides disposed along each side of the card-board and adapted to engage under the edge portions of the card-board, after it has been received from said applying means, and gradually fold said edge portion along said line and back upon the middle part of the card-board with the edges thereof in contact; and means for cutting the card-board into lengths across said holes and between said holes.

14. In a machine for forming cartons, the combination of a main frame; an impression cylinder mounted on the main frame; a punch drum coöperating with the impression cylinder; means for supporting a roll of card-board and feeding the latter between said cylinder and drum; a punch on said drum adapted to punch holes along the card-board as it is fed between said drum and cylinder; a plurality of supporting guides adapted to receive and support card-board passing from said punch drum; means adapted to moisten said card-board on the line where the card-board is later to be folded; means for applying glue to the edge of the card-board; lower guides receiving the card-board from said applying means; upper guides for holding the card-board against the lower guides; folding guides disposed on each side of said lower guides and adapted to engage under the edge portions of the card-board and gradually, as the card-board moves, to fold said edge portions along said line and back upon the middle part of the card-board; and means for cutting the card-board into lengths across said holes and mid-way between said holes.

15. In a machine for forming cartons, the combination of a main frame; a main drive shaft extending longitudinally of the main frame; means for supporting a roll of card-board or the like at the receiving end of the main frame; an impression cylinder mounted transversely of the main frame near the roll of card-board, and having geared connection with said main drive shaft; a punch drum coöperating with said impression cylinder, between which and the impression cylinder card-board is fed from the card-board roll; a punch on said punch drum adapted to punch holes along the card-board as it is fed between said punch drum and the impression cylinder; a plurality of horizontally disposed supporting guides mounted on said main frame and adapted to receive and support card-board passing from said punch drum; a pair of moistening rollers adapted to moisten the card-board on the line where the card-board is later to be folded; a glue applying roller adapted to apply glue to the edge of the card-board; inclined guides receiving the card-board from the applying rollers; upper guides for holding the card-board against the inclined guides; folding guides disposed on each side of said inclined guides and adapted to engage under the edge portions of the card-board and gradually, as the card-board moves along the guides, to fold said edge portions along said line and back upon the middle part of the card-board; pressing rollers for drawing the card-board from said inclined guides and pressing the edges of the card-board together; and means for cutting the card-board into lengths after it has passed the pressing rollers.

16. In a corrugating machine, the combination of folding means; means for feeding a strip of card-board to the folding means; means for wetting the card-board after it is received from the folding means; embossing rolls adapted to receive card-board from the wetting means; and means for heating the embossing rolls.

17. In a machine for forming and corrugating cartons, the combination of a frame; means for feeding a strip of card-board along said frame; means for applying glue to the edge of the card-board; means for engaging under the edge portions of the card-board and folding said edge portions back upon the middle part of the card-board with the edges in contact; pressing rollers for drawing the card-board from the folding means and pressing the edges thereof together; wetting rollers between which the card-board is fed; a series of pairs of corrugating rolls adapted to receive the card-board from the wetting rollers; means for heating the corrugating rolls; and means for cutting the card-board into lengths.

18. In a machine for forming and corrugating cartons, the combination of a frame; means for feeding a continuous strip of card-board along said frame; means for moistening said card-board along the line where it is later to be folded; means for applying glue to the edge of the card-board; lower guides receiving the card-board from the said applying means; upper guides for holding the card-board against the lower guides; folding guides disposed on each side of the lower guides and adapted to engage under the edge portions of the card-board and gradually, as the card-board moves, to fold said edge portions along said line and back upon the middle part of the card-board; pressing rollers for drawing the card-board from said guides and pressing the edges of the card-board together; pairs of wetting rollers adapted to receive the card-board from said pressing rollers; means for applying water to the wetting rollers; a series of pairs of superposed hollow corrugating rolls adapted to receive the card-board from said wetting rollers; means for supplying a heating medium to the interior of said rolls; and means for cutting the card-board into lengths.

19. In a machine of the character described, the combination of a frame; a plurality of horizontally disposed supporting guides mounted on said frame; means for feeding a strip of card-board along said guides; a water container supported beneath said guide; a pair of moistening rollers dipping into said container and adapted to moisten the card-board on said supporting bars on the line where the card-board is later to be folded; means for applying glue to the edge of the card-board; pressing blocks yieldably pressing the card-board against the moistening rollers; advancing rollers for drawing the card-board from said supporting guides; means for engaging under the edge portions of the card-board and gradually folding them along said line and disposing the edges of the card-board together; and pressing rollers for drawing the card-board from the folding means and pressing the edges together for gluing the same.

20. In a corrugating machine, the combination of a series of coöperating corrugating rolls, certain of said rolls being separated and spaced from the preceding rolls, whereby a drying space is provided; and means for feeding material to said rolls.

21. In a corrugating machine, the combination of a series of coöperating corrugating rolls, certain of said rolls being separated and spaced from the preceding rolls, whereby a drying space is provided; means for feeding material to said rolls; and means for wetting said strip before it is received by the rolls.

22. In a corrugating machine, the combination of a series of coöperating corrugating rolls, certain of said rolls being separated and spaced from the preceding rolls, whereby a drying space is provided; means for feeding material to said rolls; and means for blowing air across said space.

23. In a corrugating machine, the combination of a series of coöperating rolls, certain of said rolls being separated and spaced from the preceding rolls, whereby a drying space is provided; means for feeding material to said rolls; and a plurality of connecting bridges bridging said space for guiding the material across the same.

24. In a corrugating machine, the combination of a series of pairs of coöperating corrugating rolls, certain of said pairs being separated and spaced from the preceding rolls, whereby a drying space is provided; means for feeding a continuous strip of material to said rolls; means for wetting said strip before it is received by the rolls; and means for blowing air across said space.

25. In a corrugating machine, the combination of a series of pairs of coöperating rolls, certain of said pairs being separated and spaced from the preceding rolls, whereby a drying space is provided; means for feeding a continuous strip of material to said rolls; means for wetting said strip before it is received by the rolls; means for blowing air across said space; and a plurality of connecting bridges bridging said space for guiding the material across the space.

26. In a corrugating machine, the combination of a series of pairs of superposed corrugating rolls; means for feeding a continuous strip of material to said rolls; means for heating the rolls; means for wetting said strip before it is received by the corrugating rolls, certain of said pairs of rolls being separated and spaced from the preceding rolls, whereby a drying space is provided; means for blowing air across said space; and a plurality of connecting bridges bridging said space for guiding the material across the space.

27. In a machine for forming and corrugating cartons, the combination of a folding means; means for feeding a strip of cardboard to the folding means; means for securing the edges of the folded strip together; wetting rollers between which the folded card-board is fed; a pair of embossing rolls adapted to receive the card-board from the wetting rollers; and means for heating the embossing rolls.

28. In a machine for forming and corrugating cartons, the combination of a folding means; means for feeding a strip of cardboard to the folding means; means for securing the edges of the folded strip together; wetting rollers between which the folded card-board is fed; a pair of embossing rolls adapted to receive the card-board from the wetting rollers; means for heating the embossing rolls; and means for cutting the card-board into lengths.

29. In a machine of the character described, the combination of means for discharging pieces of material; a conveyer; and means for lifting boxes from the conveyer to the discharge means.

30. In a machine of the character described, the combination of means for discharging pieces of material; a means for lifting boxes; and means for pushing boxes from the lifting means to the discharge means.

31. In a machine of the character described, the combination of means for discharging pieces of material; a conveyer; means for lifting boxes from the conveyer; and means for pushing the boxes from the lifting means to said discharge means.

32. In a machine of the character described, the combination of means adapted to cut and discharge pieces of material; a support adapted to hold receiving boxes for said pieces; a conveyer for said boxes; a shaft operatively connected to the conveying means; means for rotating the shaft; a lifting means operated from said shaft for lifting boxes from the conveyer; and discharge means operated from said shaft for pushing the boxes from the lifting means to the table.

33. In a machine of the character described, the combination of a plurality of cutting devices adapted to cut lengths of material into pieces; a table adapted to hold receiving boxes for receiving said pieces; a conveyer adapted to convey boxes inwardly toward said cutting devices; a ratchet shaft operatively connected to the conveyer for operating the latter; ratchet means for rotating said ratchet shaft; a lifting cam and a discharge cam mounted on said ratchet shaft; means operated by said lifting cam for lifting boxes from said conveyer; and means operated by the discharge cam for pushing boxes from the lifting means to said table.

34. In a machine of the character described, the combination of means for cutting strips of material into lengths; a support for receiving said lengths; devices for cutting said lengths into pieces; means for conveying the lengths from said support to said cutting devices; a chute for receiving said pieces from said cutting devices; a table adapted to hold receiving boxes for said pieces as they are discharged from said chute; a traveling conveyer adapted to convey boxes inwardly beneath said chute; drums supporting the inner ends of said conveyers; a ratchet shaft; an operative connection between said ratchet shaft and said drums for driving the latter; a ratchet wheel on said ratchet shaft; a lever adapted to oscillate on said ratchet shaft and provided with a pawl engaging said ratchet wheel; a cam; a link pivoted to said lever and engaging said cam; a lifting cam and a discharge cam mounted on said ratchet shaft; means operated by said lifting cam for lifting boxes from said conveyer; and means operated by said discharge cam for pushing boxes from said lifting means to said table.

35. In a machine of the character described, the combination of a frame; means for feeding a strip of material along the frame; means for cutting said strip into lengths; a support for receiving said lengths; upper and lower knife carrying shafts mounted on said frame at one side of said support; pairs of coöperating annular knives disposed along said shafts respectively; means for conveying said lengths from said support to said knives for cutting said lengths into pieces; a chute adapted to receive said pieces; a table adapted to hold receiving boxes for said pieces; a cam shaft mounted near the discharge end of said main frame on the side remote from said knife carrying shafts; a ratchet shaft carried on the lower part of the main frame; traveling conveyers adapted to convey said receiving boxes inwardly toward the main frame and having their inner ends terminating below said discharge chute; drums supporting said inner ends and operatively connected to said ratchet shaft for rotating the drums; a ratchet wheel fixed on said ratchet shaft; a bell crank lever adapted to oscillate on said ratchet shaft and provided with a pawl engaging said ratchet wheel; a lever operating link pivoted to said bell crank and provided with a bifurcated upper end embracing said cam shaft; a roller on said lever operating link; a cam on said cam shaft and engaging said roller; a lifting cam and a discharge cam mounted on the ratchet shaft; means for lifting boxes from said conveyer and operating by said lifting cam; and a discharge bar operated from said discharge cam for pushing boxes from said lifting means to said table.

36. In a machine of the character described, the combination of means adapted to cut and discharge pieces of material; a support adapted to hold receiving boxes for said pieces; conveyers for said boxes; a shaft operatively connected to said conveyers for operating the latter; a lifting cam and a discharge cam on said shaft; means operated by said lifting cam for lifting boxes from said conveyer; a longitudinally slidable discharge bar adapted to push the boxes from said lifting means on to said support; a discharge lever linked to said discharge bar and engaged by said discharge cam; and means for rotating said shaft.

37. In a machine of the character described, the combination of means adapted to cut and discharge pieces of material; a support adapted to hold receiving boxes for said pieces; conveyers for said boxes; a shaft operatively connected to said conveyers for operating the latter; a lifting cam and a discharge cam on said shaft; a vertical guide bar; a bracket shoe slidable on said guide bar and provided with an outwardly projecting end; a lifting plate secured on said projecting end and disposed between said conveyers; a lifting lever having one end engaged by said lifting cam and the other linked to said shoe; and means operated by said discharge cam for pushing boxes from said lifting plate to said support.

38. In a machine of the character described, the combination of means adapted to cut and discharge pieces of material; a support adapted to hold boxes for receiving said pieces; conveyers for said boxes; means adapted to lift boxes from said conveyers to said support; and means for arresting the movement of the boxes on the conveyer while the lifting means is raised.

39. In a machine of the character described, the combination of means adapted to cut and discharge pieces of material; a support adapted to hold boxes for receiving said pieces; inwardly movable conveyers for said boxes; means adapted to lift boxes from said conveyers to said support; and latches for arresting the inward movement of the boxes while said lifting means is raised and adapted to be depressed by the lifting means when it is lowered.

40. In a machine of the character described, the combination of a main frame;

means adapted to cut and discharge pieces of material; a support adapted to hold boxes for receiving said pieces; traveling belt conveyers adapted to convey boxes inwardly toward said main frame; fixed guide stops for limiting the inward movement of the boxes; lifting plates adapted to be disposed between said conveyers and to lift the boxes from said conveyers; means for pushing boxes from the conveyers onto said support; and latches associated with the conveyers and adapted to arrest the inward movement of the boxes a distance from said guide stops and adapted to be depressed by said lifting plate when the lifting plate is lowered.

41. In a machine for forming cartons, the combination of a main frame; means for feeding strips of material along said main frame; means for folding the strips into tubular form; means for corrugating the folded strips; means for cutting the corrugated strips into lengths; means for cutting said lengths into pieces and discharging them laterally from the machine; conveyers extending laterally of the discharged end of the main frame for conveying receiving boxes for said pieces; a main shaft disposed longitudinally of said main frame for driving all of the aforesaid means; a clutch on said main shaft; a yoke shaft mounted across the end of the main frame and disposed along said conveyers and adapted to carry handle levers; a lever shaft disposed longitudinally on the main frame and carrying handle levers; lever arms carried on said yoke shaft and said lever shaft respectively; an intermediate lever; and links connecting opposite ends of the intermediate lever to said lever arms respectively.

42. A process of forming corrugated articles, consisting in wetting a strip of cardboard, then corrugating said strip, and heating said strip before the completion of said corrugation.

43. A process for forming cartons, said process consisting in moving a strip of material in the direction of its length; folding the strip to flattened tubular form; cutting the strip into lengths while still moving in the direction of its length; moving the lengths transversely; and simultaneously cutting the said lengths into pieces.

44. A process of forming corrugated articles, said process consisting in wetting a strip of card-board; simultaneously applying heat and corrugating said strip; then playing air across said strip; and then applying heat and pressure.

45. A process of printing and forming corrugated articles from a flat strip of material; printing upon the flat strip; and then progressively forming corrugations on the entire strip unrelated to the printing matter.

46. A process of printing and forming corrugated articles from a flat strip of material; moving a strip of material in the direction of its length; printing upon a portion of the strip while so moving; and then progressively forming longitudinal corrugations along the entire strip including the printed portion while so moving.

47. A process of printing and forming corrugated cartons, said process consisting in moving a strip of material in the direction of its length; printing upon one face of said strip as it so moves; punching holes at intervals along the strip; moistening the strip in a pair of parallel lines; applying adhesive substance to the edge of the strip; folding the strip along said lines to tubular form and fastening the edges together; flattening the tubular strip; wetting the strip; corrugating both thicknesses of the strip in a longitudinal line; gradually increasing the number of corrugations from said longitudinal line toward the edges of the tubular strip; cutting the strip into lengths while still moving in the direction of its length; moving the lengths transversely; and simultaneously cutting the lengths across said holes and mid-way between said holes.

48. A process of forming corrugated cartons, said process consisting in moving a strip of material in the direction of its length, moistening the strip in a pair of parallel lines, applying adhesive substance to the edge of the strip, folding the strip along said lines to tubular form and fastening the edges together, flattening the tubular strip, wetting the strip, and corrugating both thicknesses of the strip in a longitudinal line.

49. A process of forming corrugated cartons, said process consisting in moving a strip of material in the direction of its length, moistening the strip in a pair of parallel lines, applying adhesive substance to the edge of the strip, folding the strip along said lines to tubular form and fastening the edges together, and flattening the tubular strip.

50. A process of forming corrugated articles, consisting in corrugating a moist strip, and heating said strip before the completion of said corrugation.

51. A process of forming corrugated articles, consisting in wetting a strip of cardboard, and simultaneously corrugating and heating said strip.

JAMES M. ANDREWS.

Witnesses:
 RICHARD E. JONES,
 THEODORE P. A. VON THIEN.